Sept. 2, 1924.
J. J. WEIER
1,507,012
VEHICLE DRIVING AND STEERING MECHANISM
Filed April 8, 1922
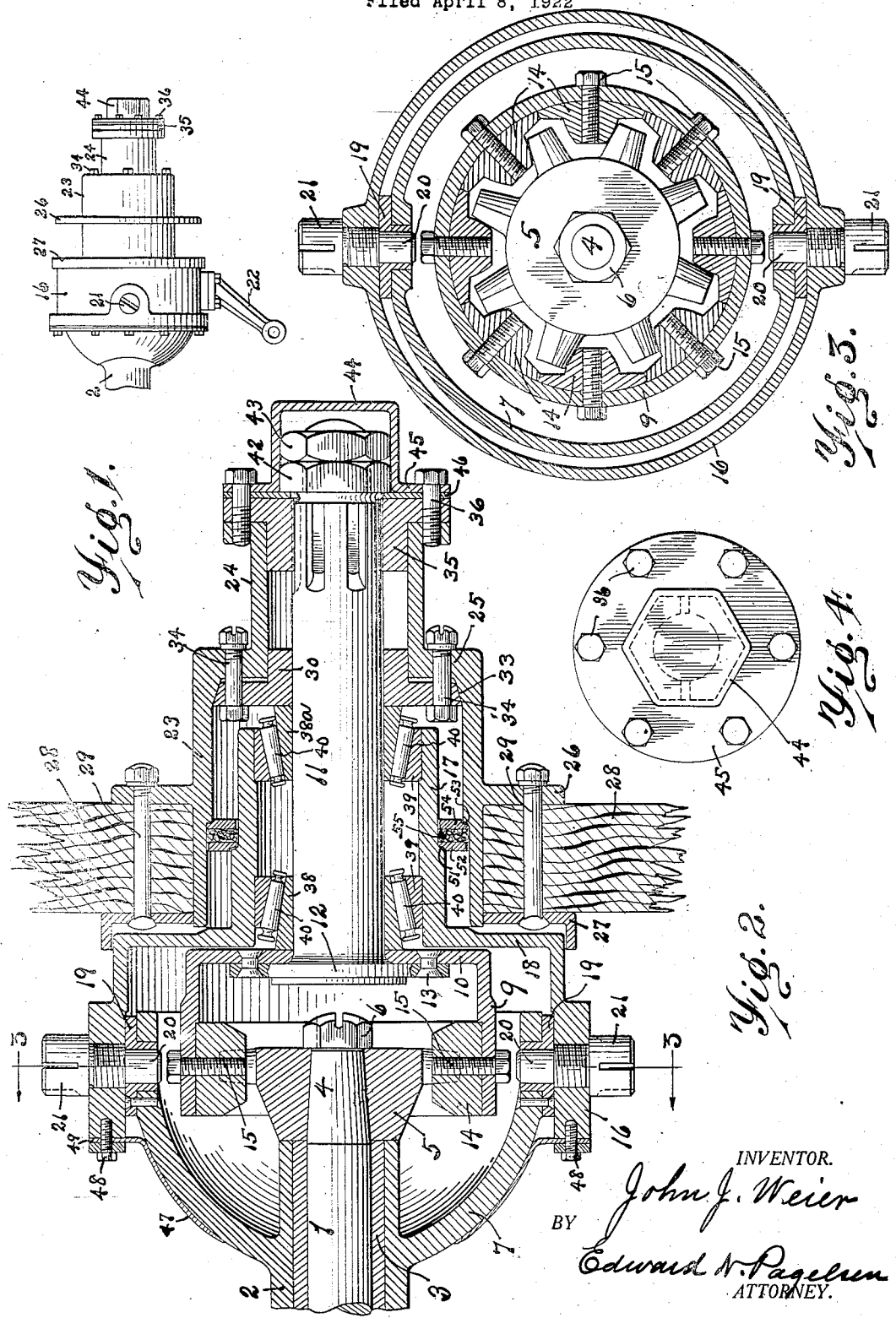
INVENTOR.
John J. Weier
BY
Edward N. Pagelsen
ATTORNEY.

Patented Sept. 2, 1924.

1,507,012

UNITED STATES PATENT OFFICE.

JOHN J. WEIER, OF BIRMINGHAM, MICHIGAN.

VEHICLE DRIVING AND STEERING MECHANISM.

Application filed April 8, 1922. Serial No. 550,707.

*To all whom it may concern:*

Be it known that I, JOHN J. WEIER, a citizen of the United States, and residing at Birmingham, in the county of Oakland and State of Michigan, have invented a new and Improved Vehicle Driving and Steering Mechanism, of which the following is a specification.

This invention relates to driving mechanism for steering wheels of motor vehicles, whether these wheels are at the front or rear of the vehicle, and the object of this invention is to provide a driving and steering mechanism of this character with adjusting devices for the bearings, to provide a device of this character with novel lubricant retaining devices, and to provide a device of this character which shall have great strength and yet can be provided at moderate cost.

This invention consists, in combination with a driving axle and its housing, a stub-axle and the gearing connecting the same to the driving axle, of a spindle connected to the main axle housing to swing on a vertical pivot, bearings for the stub-axle within the spindle, and means to secure a wheel hub onto the stub-axle so that the hub will extend over that portion of the spindle which contains the bearings.

It also consists in a pair of metal rings and a fibrous gasket between them located between the spindle and hub to prevent the escape of lubricant.

In the accompanying drawing, Fig. 1 is a plan of a wheel hub and its supporting mechanism. Fig. 2 is a vertical central section thereof. Fig. 3 is a section on the line 3—3 of Fig. 2. Fig. 4 is an elevation of a hub cap.

Similar reference characters refer to like parts throughout the several views.

The main axle 1 may be of any desired construction and may be rotated in any desired manner. It is rotatable in a housing 2, a bearing bushing 3 being provided if desired. The outer end 4 of the shaft is preferably tapered to fit an externally-toothed driving member 5 which may be held in position by a nut 6. A substantially hemispherical supporting head 7 is preferably formed integral with the housing 2.

A cup-shaped member consisting of a cylindrical portion 9 and a radial flange 10 is secured to the inner end of the stub-axle 11 which is formed with a flange 12 which may be attached to the flange 10 by means of rivets 13. A ring of internal teeth 14 may be secured within the cylindrical portion 9 by means of screws 15 and these teeth are preferably formed separately so that they may be easily replaced when broken. The teeth of both sets are so formed that they permit the stub-axle to extend at an angle to the main axle. The details thus far described are also found in my former Patent No. 1,260,495, dated March 26, 1918.

Extending around the head 7 is one end of a supporting spindle for the stub-axle which consists of two cylindrical sleeves 16 and 17 and a radial flange 18 between them. Bushings 19 are mounted diametrically opposite each other in the head 7 and they receive the reduced bearing ends 20 of the screws 21 mounted in the sleeve 16 of the spindle which may be swung on these ends 20 relative to the main axle by means of the steering arm 22. See Fig. 1.

The wheel hub consists of two cylindrical portions 23 and 24, a radial portion 25 connecting them, and a rigid flange 26 and a movable flange 27 which may be drawn against the spokes 28 by means of bolts 29 in the usual manner. A bearing bushing 30 on the stub-axle has a bevelled edge which bears on a similar surface 33 within the hub and this bushing is held in position by the bolts 34. A second bushing 35 is splined on the stub-axle and connected to the end of the hub by the screws 36. The hub is therefore driven by the axle 11 through this splined bushing.

The stub-axle is rotatably supported within the spindle and particularly within the sleeve 17 by means of roller bearings having inner bearing rings 38 and 38ª, outer bearing rings 39 and rollers 40. The bushing 30 bears against the bearing ring 38ª and the hub may be forced inwardly by the nuts 42 and 43 on the end of the stub-axle 11 to adjust the bearings. A hub cap 44 is preferably hexagonal to fit these nuts to keep them from turning and its flange 45 may be secured in position by the same screws 36. A packing ring 46 may be employed to prevent leakage of lubricant.

In order to prevent loss of lubricant and the entrance of dust at the connection between the spindle and the spherical head 7, a spherical cap 47 may be attached to the inner edge of the cylindrical portion 16 of the spindle by the screws 48 which pass through the flange 49 of this cap and hold it closely against the head 7. To prevent lubricant escaping between the spindle and the part 23 of the hub, the spindle is shown formed with an external shoulder 51 to support a ring 52 forced onto the spindle, and the hub is formed with an internal shoulder 53 to support the ring 54 forced into the hub, and a packing gasket 55 of fibrous material is held between these rings and prevents the escape of the lubricant.

The advantages of the present construction reside in the small diameter of the roller bearings, in the great over-all length of the support supplied by these bearings which results in great stiffness of the wheel, and in the practical means for preventing the escape of the lubricant.

The details of construction and the proportions of the parts may all be changed by those skilled in the art without departing from the spirit of my invention as set forth in the following claims.

I claim:—

1. A steering and driving mechanism for motor vehicles, comprising a driving shaft and a housing therefor, a head on the end of said housing, a spindle pivotally connected to said housing and comprising a cylindrical outer end, a pair of roller bearings mounted within the cylindrical end of the spindle, a stub-axle journaled in said bearings, a wheel hub extending over the outer end of the stub-axle, a bushing secured within the hub and slidable upon the stub-axle and adapted to engage one of said bearings to adjust said bearings, and means to operatively connect the outer ends of the hub and stub-axle.

2. A steering and driving mechanism for motor vehicles, comprising a driving shaft and a housing therefor, a head on the end of said housing, a spindle pivotally connected to said housing and comprising a cylindrical outer end, a pair of roller bearings mounted within the cylindrical end of the spindle, a stub-axle journaled in said bearings, a wheel hub extending over the outer end of the stub-axle, a bushing secured within the hub and slidable upon the stub-axle and adapted to engage one of said bearings to adjust said bearings, the outer end of the stub-axle being formed with longitudinal grooves and threads outside the grooves, a bushing secured within the outer end of the hub and fitting the end of the stub-axle and in its grooves, and nuts on the threaded end of the axle to retain said hub.

3. A steering and driving mechanism for motor vehicles, comprising a driving axle and a housing therefor, a head on said housing, a spindle pivotally connected to said housing to swing on a vertical axis, bearings within the spindle, a stub-axle journaled in said bearings, a wheel hub secured to the stub-axle gears operatively connecting the driving shaft and stub-axle, a metal ring fitting within said hub, a second ring fitting on said spindle, and a lubricant retaining gasket between the rings.

JOHN J. WEIER.